3,384,825
FREQUENCY DETERMINING CRYSTAL-VIDEO RECEIVER SYSTEM WITH ANALOG READOUT
Richard A. Tauson, Bradfordwoods, and Everard M. Williams, Pittsburgh, Pa., assignors to the United States of America as represented by the Secretary of the Army
Filed Jan. 5, 1965, Ser. No. 423,614
3 Claims. (Cl. 325—332)

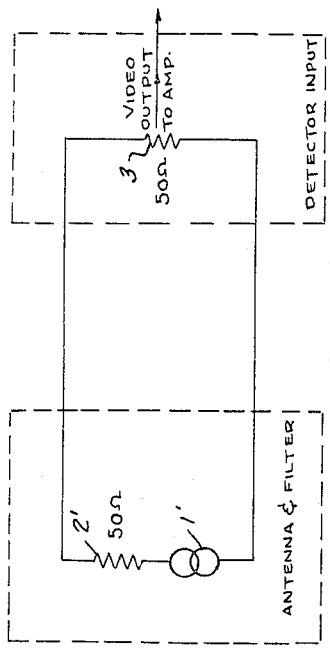
Fig. 1
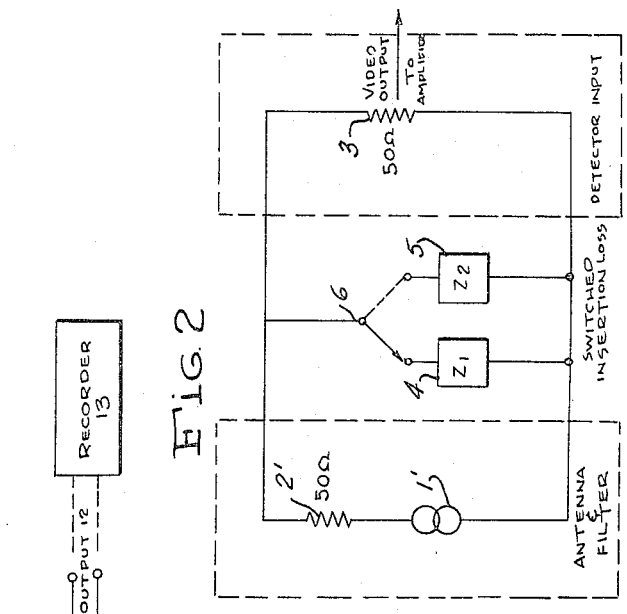
Fig. 2
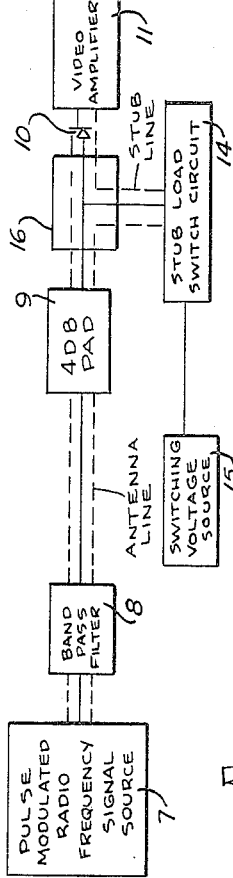
Fig. 3
Fig. 4
INVENTORS
EVERARD M. WILLIAMS
RICHARD A. TAUSON
BY Joseph A. Hill
ATTORNEY

United States Patent Office 3,384,825
Patented May 21, 1968

ABSTRACT OF THE DISCLOSURE

The present invention pertains to a modification of crystal-video receivers for analog readout of radio frequency signals by the utilization of a stub line terminated in two different impedance loads and switching means therefor for switching the different loads into the circuit. An impedance matching pad is connected between the radio frequency input and the stub line to balance the insertion losses produced by the stub line. A detector, an amplifier and a recorder are coupled to the output of the circuit for recording the received signals.

---

In the reception of radio frequency signals, it is often important that the frequency of the incoming signal be determined. The determination of the frequency of the received signal may be accomplished by selective tuning of the receiving circuit. However, it is often desirable to dispense with the necessity of manual instantaneous tuning of the receiving circuit.

Also, it is often desirable to monitor a wide band of frequencies and determine the frequency of any incoming signal within the band. It is, therefore, a principal object of the invention to provide a device which will monitor a wide band of radio frequencies and determine the frequency of any of the incoming signals which are received without the necessity of instantaneous manual tuning.

A further object of this invention is to monitor a wide band of radio frequencies continuously and record, in analog form, on magnetic tape or wire the frequency of those signals which are received in order to allow a later playback by the operator of the device.

Additional objects, advantages, and features of invention reside in the particular construction, arrangement, and combination of parts involved in the embodiment of the invention, as will be understood from the following description and accompanying drawings wherein:

FIG. 1 is a diagrammatic representation of the antenna and radio frequency input and detector components of a crystal-video receiver;

FIG. 2 is a diagrammatic representation of the proposed modification of the above circuit embodied in the invention disclosed herein;

FIG. 3 is a block diagram representing a specific embodiment of the invention described herein; and FIG. 4 is a circuit diagram of the stub load switch circuit.

The antenna and the radio frequency input and detector components of a crystal-video receiver may be assumed to be represented by the idealized equivalent circuit of FIG. 1 wherein the antenna 1′ or signal source is represented as being in series with a 50 ohm resistor 2′ which represents the resistance of the antenna or signal source and filter components and another resistance 3 which represents the total resistance of the radio frequency detector components.

The proposed modification consists of inserting in parallel with the transmission line two frequency-dependent impedances 4 and 5 and a switching means 6 for rapidly switching between them. This configuration is approximately represented over a limited frequency range by the equivalent circuit of FIG. 2. This modification will produce two outputs in proportion to the two impedances 4 and 5 offered to the incoming signal frequency. These two outputs consist of two insertion losses which are proportional to the incoming signal frequency and the two impedances 4 and 5. The insertion loss is provided by a transmission line stub terminated in two resistive loads, one smaller than and one larger than the characteristic impedance of the line comprising the stub.

The insertion-loss characteristic can be used for frequency discrimination as follows. The receiver input is rapidly switched back and forth from one impedance condition to the other. The frequency of a received signal is determined from the ratio of the receiver output with one impedance condition connected to the receiver output and with the other impedance condition connected. Over the entire range of frequencies below the frequency at which the stub-line is one quarter of a wave length long this ratio is a single valued monotonic function of frequency, and will be called the "discrimination ratio."

The switching between the two impedances is produced by rapidly alternating the voltage across a semi-conductor diode 24. A crystal rectifier diode such as a Varicap has been found to be quite effective to accomplish this purpose.

One embodiment of the invention described herein is represented by the block diagram of FIG. 3. A signal from a pulse modulated radio frequency signal source 7 is fed through a band pass filter 8 which limits the signal to a desired frequency range and to a 4 decibel matching pad 9. The signal is then fed through the detector diode 10 to a video amplifier 11 and from there to output terminals 12 which may be connected to a recorder 13. The variable impedance switch circuit 14 is connected in parallel between the 4 decibel matching pad 9 and the detector diode 10. A switching voltage source 15 is connected to the variable impedance switch circuit 14 and generates a square wave voltage waveform to produce the two different biases across the switching diode which in turn produces the two different impedances. These two impedances produce two frequency dependent outputs from the detector diode 10 and the amplifier 11. This invention allows for the recording of the video output signals on a magnetic tape or wire recording device 13 with a synchronization signal to identify which of the two switched modes corresponds to each portion of the output signals. By recording these signals the monitoring of a wide band of incoming radio frequency signals is made possible without the necessity of instantaneous manual operation of the device. In this way the tape may be played back at any convenient time and the frequency of any given incoming signal within a broad band of frequencies may be identified.

The switching diode is located in the stub load switch circuit 14. The function of the switching diode is to provide two different resistive incremental impedances for two different bias conditions. The operation of the switching diode is such that the positive portion of the square wave voltage reverse biases the diode for coupling in one impedance and the negative portion of the square wave voltage forward biases the diode for coupling in the other impedance. These two impedances are frequency dependent and their ratio, which we term the discrimination ratio, is distinctive of the given frequency signal being received. Silicon and germanium diodes provide different impedances which are dependent upon the voltage bias applied to the diode. Although most crystal diodes reflect to a greater or lesser extent this characteristic of impedance variability in correspondence to voltage bias, the capacitance of the silicon diode does not decrease nearly as significantly with increasing frequency as does that of the germanium diode. Consequently, the reverse bias condition requirements for the diode to be used in the switch are better met by germanium point-contact diodes than by those of silicon.

FIG. 4 illustrates the circuit diagram of the stub load switch circuit 14. The switching diode 24 is the Hughes HPA 2800. Capacitor 25 in series with the diode 24 has a capacitance of 200 micromicrofarads. The switching voltage is applied to terminals 27 across condenser 25 and the radio frequency input is applied across terminals 26. Capacitor 20 has a value of 2000 micromicrofarads. One inductance coil 21 in parallel with the diode 24 has a value of 39 millimicrohenries. The other inductance coil 22 in parallel with the diode 24 has an inductance of 0.3 millimicrohenry. In series with inductance coil 22 there is a resistance 23 of 420 ohms. The purpose of the parallel inductance incorporated in the switch is to provide a D.C. return path for the switching signal applied to the diode. It can also be made to act as the entire load presented to the radio-frequency signal when the diode is in the reverse-bias condition. It must, therefore, fulfill two requirements: (1) that its impedance to D.C. and to audio frequencies be small compared to 50 ohms, and (2) that its impedance to the radio frequencies involved be of the order of the impedance level desired for the stub-line load when the diode is reverse biased.

The stub line for this device is constructed of 50 ohm coaxial cable type RG-58c/U terminated in type BNC coaxial connectors. The connection to the antenna line is made through a type BNC T unit 16. The length of the stub line used (measured from the position of the center conductor junction in the T to the end of the dielectric material in the connector on which the switch components are mounted) is 30 centimeters.

It has been found experimentally that the antenna-line effects are of sufficient importance to require the incorporation of modifications compensating for such effects. Such modification is realized in the insertion of an impedance matching pad 9 between the band pass filter 8 and the stub load switching circuit 14 as illustrated in FIG. 3. Such a pad has the effect of loading the antenna line with an impedance approximately equal to its characteristic impedance over the entire frequency range and of placing the signal source at the input to the stub line. It may be shown that the input impedance of a transmission line terminated in its characteristic impedance is just the characteristic impedance of the line. This matching is accomplished, of course, at the cost of such insertion-loss or attenuation as may be characteristic of the pad selected, the degree of matching improving with increasing attenuation. It is considered that sufficient matching can be achieved to give adequate discrimination without severely compromising receiver sensitivity. This is exemplified in FIG. 3 by the insertion of a 4 db attenuator which provides the system shown with sufficient matching to yield the necessary single-valued behavior in the frequency-discrimination ratio.

Referring to FIG. 3, the output of the crystal detector diode 10 will appear as a series of stretched pulses of two different amplitudes, and a superimposed signal derived from the switching signal to establish the correspondence between the two pulse amplitudes and the two switched states.

It is the purpose of the video amplifier 11 and recorder 13 to amplify, modify (by stretching to increase low frequency content), and record the pulses described above i nsuch fashion that when the signals are later removed from the record there will be a one-to-one correspondence between the amplitudes of the input pulses and the amplitudes of the output signals and that the amplitudes will be sufficiently well defined by the output that the discrimination ratio calculated from these amplitudes will correctly identify the radio frequency of the incoming signal.

We claim:
1. A system for obtaining analog readout of radio frequencies from a crystal-video receiver comprising:
 (a) a signal source;
 (b) frequency limiting means;
 (c) crystal-video detector means;
 (d) a first transmission line connecting said signal source through said frequency limiting means to said crystal-video detector means;
 (e) a second transmission line selectively terminated in different impedance means including switching means therefor and connected to said first transmission line to provide for different frequency dependent insertion losses between said signal source and said crystal-video detector means when the switching means is actuated;
 (f) an impedance matching means connected between said first transmission line and said second transmission line to balance the insertion losses produced by said second transmission line terminated in said impedance means; and
 (g) recorder means connected to the output of said video detector means whereby the ratio of the different receiver outputs resulting from the insertion of said different impedance means selectively terminating said second transmission line determines the frequency of a received signal.

2. A system for obtaining analog readout of radio frequencies from a crystal-video receiver comprising:
 (a) a pluse modulated radio frequency signal source;
 (b) band pass filter means;
 (c) a crystal-video detector means;
 (d) a coaxial antenna line connecting said signal source through said band pass filter means to said crystal-video detector means;
 (e) a stub line selectively terminated in different impedance means including switching means therefor and connected to said coaxial antenna line to provide for different frequency dependent insertion losses between said signal source and said crystal-video detector means when said switching means is actuated;
 (f) a matching pad connected between said antenna line and said stub line to balance the insertion losses produced by said stub line terminated in said impedance means; and
 (g) recorder means connected to the output of said detector means whereby the ratio of the different receiver outputs resulting from the insertion of said different impedance means selectively terminating said stub line determines the frequency of received signals.

3. A system as recited in claim 2 wherein said switching means comprises a switching diode connected to a switching voltage source producing a square wave voltage reverse biasing said switching diode during a positive portion of the square wave voltage and forward biased during a negative portion of the square wave voltage, said switching diode alternately connecting first and second resistive loads terminating said stub line, said first resistive load being greater than the characteristic impedance of said stub line and second resistive load being less than the characteristic impedance of said stub line.

No references cited.

KATHLEEN H. CLAFFY, *Primary Examiner.*

WILLIAM C. COOPER, *Examiner.*

R. S. BELL, *Assistant Examiner.*